United States Patent
Shen et al.

(10) Patent No.: US 10,341,140 B2
(45) Date of Patent: Jul. 2, 2019

(54) DYNAMIC NETWORK SERVICE OVERLAY ESTABLISHMENT IN HUB-AND-SPOKE PACKET SWITCHING NETWORKS

(71) Applicants: Tony Changhong Shen, Shanghai (CN); Di Cheng, Shanghai (CN); Will Lipeng Jiang, Shanghai (CN); Kathy Xia Ke, Shanghai (CN)

(72) Inventors: Tony Changhong Shen, Shanghai (CN); Di Cheng, Shanghai (CN); Will Lipeng Jiang, Shanghai (CN); Kathy Xia Ke, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 295 days.

(21) Appl. No.: 15/015,439

(22) Filed: Feb. 4, 2016

(65) Prior Publication Data
US 2017/0230199 A1    Aug. 10, 2017

(51) Int. Cl.
*H04L 12/46* (2006.01)
*H04L 12/751* (2013.01)

(52) U.S. Cl.
CPC ...... *H04L 12/4641* (2013.01); *H04L 12/4633* (2013.01); *H04L 45/02* (2013.01)

(58) Field of Classification Search
CPC .. H04L 12/4641; H04L 12/4633; H04L 45/02
See application file for complete search history.

(56) References Cited

U.S. PATENT DOCUMENTS

| 7,373,660 B1 | 5/2008 | Guichard et al. |
| 8,260,922 B1 * | 9/2012 | Aggarwal ............... H04L 45/24 709/226 |
| 8,346,961 B2 | 1/2013 | Asati et al. |
| 8,499,095 B1 | 7/2013 | Sullenberger et al. |
| 2009/0182894 A1 * | 7/2009 | Vasseur .................. H04L 45/02 709/239 |

(Continued)

OTHER PUBLICATIONS

RFC, NBMA Next Hop Resolution Protocol, RFC 2332, Apr. 1998.*

(Continued)

*Primary Examiner* — Zhensheng Zhang
(74) *Attorney, Agent, or Firm* — The Law Office of Kirk D. Williams

(57) ABSTRACT

In one embodiment, a packet switching device is configured to operate as a spoke or a hub in a Dynamic Multipoint Virtual Private Network (DMVPN) using one or more initially negotiated service overlay capabilities including service encapsulation to use in communicating service overlay data packets between the packet switching device and another device (e.g., spoke, hub) of the DMVPN over an established tunnel (e.g., secure protocol channel). The packet switching device is further configured to negotiate updated one or more service overlay capabilities including updated service encapsulation to use in communicating service overlay data packets with another device (e.g., spoke, hub) without dropping the already established tunnel. In one embodiment, the negotiation between the packet switching device and another device (e.g., spoke, hub) of the DMVPN uses Next Hop Resolution Protocol (NHRP). In one embodiment, the service encapsulation uses Network Service Header (NSH).

19 Claims, 10 Drawing Sheets

(56) References Cited

U.S. PATENT DOCUMENTS

| | | |
|---|---|---|
| 2014/0362682 A1 | 12/2014 | Guichard et al. |
| 2014/0380460 A1 | 12/2014 | Bhalerao et al. |

OTHER PUBLICATIONS

Mike Sullenberger, "Advanced Concepts of DMVPN(Dynamic Multipoint VPN)," 2015, Cisco Systems, Inc., San Jose, CA (120 pages).

"Configuring NHRP," IP Addressing: NHRP Configuration Guide, Cisco IOS XE Release 3S, 2013, Cisco Systems, Inc., San Jose, CA (36 pages).

"Configuring NHRP," 2007, Cisco Systems, Inc., San Jose, CA (38 pages).

"Cisco IOS DMVPN Overview," Feb. 2008, Cisco Systems, Inc., San Jose, CA (46 pages).

Quinn et al., "Network Service Header," draft-ietf-sfc-nsh-01.txt, Jul. 23, 2015, The Internet Society, Reston, VA (43 pages).

Quinn et al., "Network Service Header," draft-ietf-sfc-nsh-02.txt, Feb. 12, 2014, The Internet Society, Reston, VA (21 pages).

Quinn et al., "Service Function Chaining (SFC) Architecture," draft-quinn-sfc-arch-05.txt, May 5, 2014, The Internet Society, Reston, VA (31 pages).

Quinn et al., "Network Service Header," draft-ietf-sfc-nsh-07.txt, Feb. 24, 2015, The Internet Society, Reston, VA (43 pages).

"Dynamic Multipoint IPsec VPNs (Using Multipoint GRE/NHRP to Scale IPsec VPNs)," Document ID 41940, Jan. 4, 2006, Cisco Systems, Inc., San Jose, CA (54 pages).

"IP Addressing: NHRP Configuration Guide, Cisco IOD XE Release 3S," 2013, Cisco Systems, Inc., San Jose, CA (56 pages).

"Dynamic Multipoint VPN Hub and Spoke Introduction," Nov. 2004, Cisco Systems, Inc., San Jose, CA (43 pages).

"Advanced IPSec Deployments and Concepts of DMVPN Networks," 2004, Cisco Systems, Inc., San Jose, CA (69 pages).

"Migrating from Dynamic Multipoint VPN Phase 2 to Phase 3: Why and How to Migrate to the Next Phase," 2006, Cisco Systems, Inc., San Jose, CA (16 pages).

Luciani et al., "NBMA Next Hop Resolution Protocol (NHRP)," RFC 2332, Apr. 1998, The Internet Society, Reston, VA (52 pages).

D. Cansever, "NHRP Protocol Applicability Statement," RFC 2333, Apr. 1998, The Internet Society, Reston, VA (9 pages).

J. Luciani, "A Distributed NHRP Service Using SCSP," RFC 2335, Apr. 1998, The Internet Society, Reston, VA (7 pages).

J. Luciani, "Classical IP and ARP over ATM to NHRP Transition," RFC 2336, Jul. 1998, The Internet Society, Reston, VA (5 pages).

Luciani et al., "NHRP with Mobile NHCs," RFC 2520, Feb. 1999, The Internet Society, Reston, VA (8 pages).

Carlson et al., "Guidelines for Next Hop Client (NHC) Developers," RFC 2583, May 1999, The Internet Society, Reston, VA (9 pages).

M. Davision, "ILMI-Based Server Discovery for NHRP," RFC 2603, Jun. 1999, The Internet Society, Reston, VA (6 pages).

Greene et al., "Definitions of Managed Objects for the NBMA Next Hop Resolution Protocol (NHRP)," RFC 2677, Aug. 1999, The Internet Society, Reston, VA (67 pages).

Fox et al., "NHRP Support for Virtual Private Networks," RFC 2735, Dec. 1999, The Internet Society, Reston, VA (12 pages).

"Per-Tunnel QoS for DMVPN," Dynamic Multipoint VPN Configuration Guide, Cisco IOS XE Release 3S, Jan. 10, 2014, Cisco Systems, Inc., San Jose, CA (18 pages).

"Shortcut Switching Enhancements for NHRP in DMVPN Networks," May 6, 2011, Cisco Systems, Inc., San Jose, CA (13 pages).

"Configuring IKE and IPsec Policies," User Guide for Cisco Security Manager 4.1, Chapter 22, Mar. 15, 2011, Cisco Systems, Inc., San Jose, CA (64 pages).

* cited by examiner

INITIAL ESTABLISHMENT

INITIAL ESTABLISHMENT

SPOKE INITIATING CHANGE

SPOKE INITIATING CHANGE

HUB INITIATING CHANGE

HUB INITIATING CHANGE

SPOKE OF SPOKE-TO-SPOKE INITIATING CHANGE

SPOKE OF SPOKE-TO-SPOKE INITIATING CHANGE

DYNAMIC NETWORK SERVICE OVERLAY ESTABLISHMENT IN HUB-AND-SPOKE PACKET SWITCHING NETWORKS

TECHNICAL FIELD

The present disclosure relates generally to packet switching network communications.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology in packet switching networks of various topologies.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1:
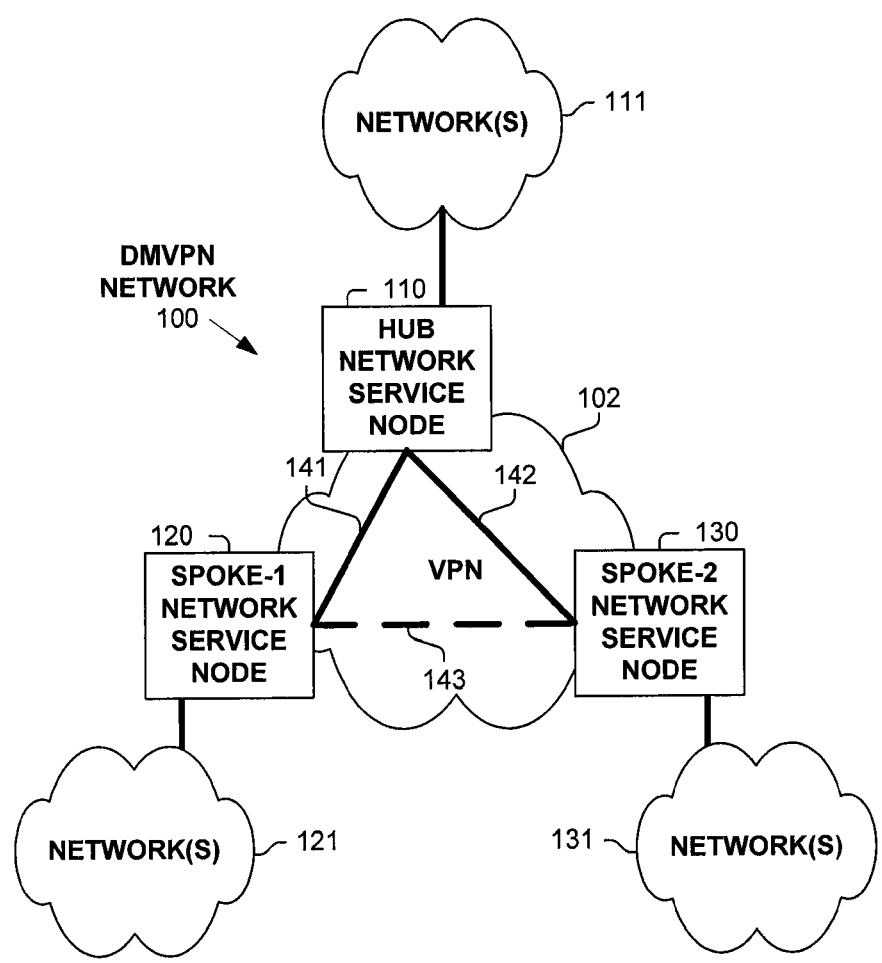
FIG. 1 illustrates a network operating according to one embodiment.

Disclosed are, inter alia, methods, apparatus, computer-storage media, mechanisms, and means associated with dynamic network service overlay establishment in hub-and-spoke packet switching networks.

One embodiment includes a method, comprising: establishing a tunnel between a spoke and a hub of a Dynamic Multipoint Virtual Private Network (DMVPN); establishing routing adjacency and one or more negotiated service overlay capabilities including service encapsulation to use in communicating service overlay data packets between the spoke and the hub; communicating packets including data packets using the service encapsulation between the spoke and the hub; negotiating updated one or more service overlay capabilities including updated service encapsulation to use in communicating service overlay data packets between the spoke and the hub without dropping at least one of said established tunnel and said established routing adjacency subsequent to communicating packets including data packets using the service encapsulation between the spoke and the hub; and communicating packets including data packets using the updated service encapsulation between the spoke and the hub subsequent to negotiating updated one or more service overlay capabilities. In one embodiment, the spoke initiates updating the service capabilities. In one embodiment, the hub initiates updating the service capabilities.

One embodiment includes a method, comprising: establishing a tunnel adjacency between a first spoke and a second spoke of a Dynamic Multipoint Virtual Private Network (DMVPN), with each of the first spoke and the second spoke in communication with a hub; establishing routing adjacency and one or more negotiated service overlay capabilities including service encapsulation to use in communicating service overlay data packets between the first spoke and the second spoke; communicating packets including data packets using the service encapsulation between the first spoke and the second spoke; subsequent to communicating packets including data packets using the service encapsulation between the first spoke and the second spoke, negotiating updated one or more service overlay capabilities including updated service encapsulation to use in communicating service overlay data packets between the spoke and the hub without dropping at least one of said established tunnel and said established routing adjacency; and communicating packets including data packets using the updated service encapsulation between the spoke and the hub subsequent to negotiating updated one or more service overlay capabilities.

In one embodiment, the tunnel is a secure protocol channel. In one embodiment, routing adjacency is dropped, but the tunnel is not dropped. In one embodiment, neither the tunnel nor routing adjacency is dropped which allows packets to continue to be communicated using the established routing adjacency until the updated routing adjacency is established. In one embodiment, this transfer from the established to the updated routing adjacency is performed seamlessly such that no packet traffic is dropped.

2. Example Embodiments

Disclosed are, inter alia, methods, apparatus, computer-storage media, mechanisms, and means associated with dynamic network service overlay establishment in hub-and-spoke packet switching networks. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processing elements, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

FIG. 1 illustrates a Dynamic Multipoint Virtual Private Network (DMVPN) network 100 operating according to one embodiment. One embodiment uses DMVPN phase 1. One embodiment uses DMVPN phase 2. One embodiment uses DMVPN phase 3.

Shown are three packet switching devices 110, 120, and 130 and an interconnecting network 102, which typically includes multiple packet switching devices. Respectively behind each of packet switching devices 110, 120 and 130 is network(s) 111, 121, and 131 with each typically including packet switching devices and/or end user devices (e.g., servers, workstations).

Packet switching device 110 is configured as a hub network service node (e.g., enterprise node with network service awareness, including encapsulating and decapsulating network service packets). Each of packet switching devices 120 and 130 is configured as a spoke network service node (e.g., branch node with network service awareness, including encapsulating and decapsulating network service packets).

In one embodiment, spoke-1 120 and/or spoke-2 130 establish a secure protocol channel and routing adjacency (141 and/or 142, respectively) with hub network service node 110.

The term "routing adjacency" is typically used herein, and may also be known as "DMVPN routing adjacency," "tunnel routing adjacency," or by another term.

As used herein, a tunnel is either a secure or unsecure protocol channel. As one embodiment establishes and uses secure protocol channels, such as, but not limited to, using Internet Protocol Security (IPsec), possibly using Internet Key Exchange (IKE).

One embodiment is often described herein establishing using these secure protocol channels, with this description applicable to using secure and/or unsecure tunnels.

In one embodiment, each of spoke-1 120 and spoke-2 130 establishes a secure protocol channel and routing adjacency (141 and/or 142, respectively) with hub network service node 110, and then a tunnel and routing adjacency (143) between themselves.

Figure 2A:
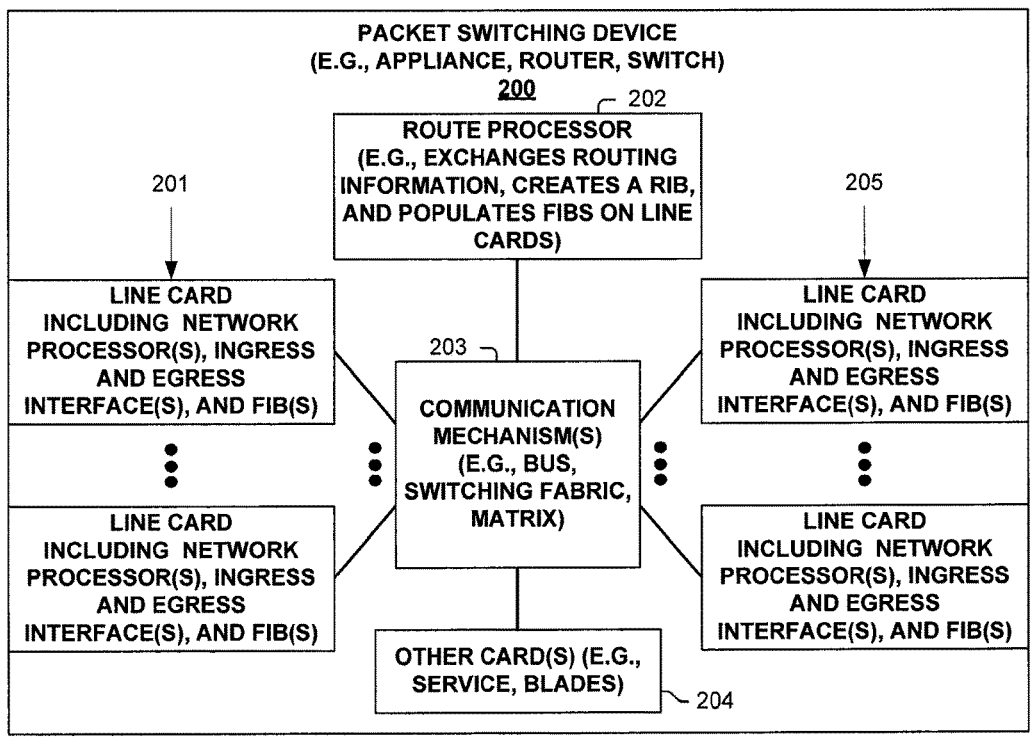
FIG. 2A illustrates a packet switching device according to one embodiment.

One embodiment of a packet switching device 200 is illustrated in FIG. 2A. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with dynamic network service overlay establishment in hub-and-spoke packet switching networks. Packet switching device 200 also has a control plane with one or more processing elements 202 for managing the control plane and/or control plane processing of packets associated with dynamic network service overlay establishment in hub-and-spoke packet switching networks. Packet switching device 200 also includes other cards 204 (e.g., service cards, blades) which include processing elements that are used in one embodiment to process packets associated with dynamic network service overlay establishment in hub-and-spoke packet switching networks, and some communication mechanism 203 (e.g., bus, switching fabric, matrix) for allowing its different entities 201, 202, 204 and 205 to communicate.

Line cards 201 and 205 typically perform the actions of being both an ingress and egress line card, in regards to multiple other particular packets and/or packet streams being received by, or sent from, packet switching device 200. In one embodiment, line cards 201 and/or 205 perform packet processing operations, including, but not limited to, determining how to ingress and/or egress process packets. Even though the term FIB includes the word "forwarding," this information base typically includes other information describing how to process corresponding packets.

Figure 2B:
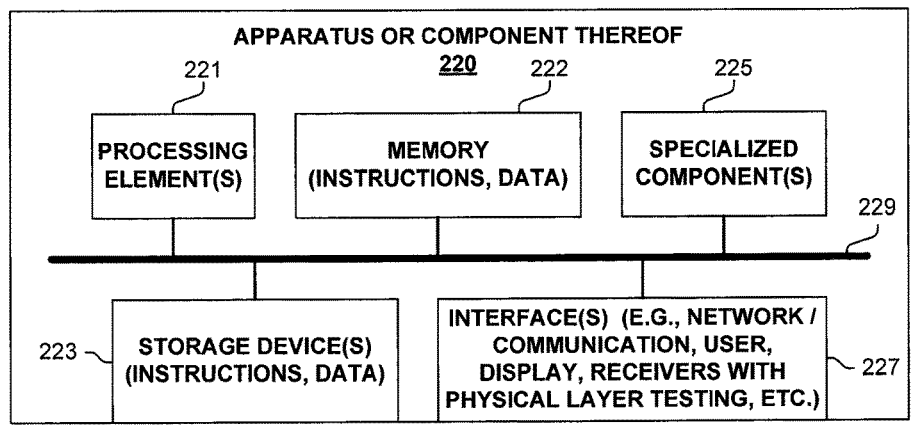
FIG. 2B illustrates an apparatus or component thereof according to one embodiment.

FIG. 2B is a block diagram of an apparatus 220 used in one embodiment associated with dynamic network service overlay establishment in hub-and-spoke packet switching networks. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processing element(s) 221 (typically with on-chip memory), memory 222, storage device(s) 223, specialized component(s) 225 (e.g. optimized hardware such as for performing lookup and/or packet processing operations, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

Data center, cloud and intelligent network architectures require more flexible service function deployment models. Metadata and Network Service Header (NSH) (current specification available at https://tools.ietf.org/html/draft-ietf-sfc-nsh-01) are widely used to address the typical requirements. However, a NSH aware control plane is outside the scope of this NSH specification.

The approach taken by NSH is composed of the following elements:

1. Service Function Path identification,
2. Transport independent service function chain, and
3. Per-packet network and service metadata or optional variable TLV metadata.

In one embodiment, Cisco TrustSec (CTS) and Performance Routing Version 3 (PFRV3) Multiple Datacenter and Transit site support use NSH as control plane signaling of service capabilities in implementing feature specific service functions over VPN networks. Note, Cisco Meta Data (CMD) is an alternative to, or used in conjunction with, NSH in one embodiment.

In one embodiment, Next Hop Resolution Protocol (NHRP) (e.g., NHRP Phase 1 or NHRP Phase 2) is used to provide service context and metadata exchange for a client, application, or service, which needs some metadata/service information to be carried in data packets over Overlay VPN networks like DMVPN, FlexVPN, etc.

Different overlay services run over DMVPN network of one embodiment include, but are not limited to, PfRV3 Multiple-Datacenter/Multiple-nexthop (MDC/MNH), TrustSec, Application-ID carry-on. Typically, each of these services/features requires a specific NSH header type defined and passed between spokes and hubs. Before data packets can use these new capabilities with new service headers, a negotiation between a spoke and a hub, or a spoke and a spoke, must occur so that the two service node endpoints are providing the same services and using the same service encapsulation.

In one embodiment, updating and/or augmenting metadata from applications or services results in new capability exchange, negotiation, and NSH metadata and policy enforcement between Service Nodes (e.g., hubs and spokes that are service-aware). Such overlay service update includes deactivating or withdrawing currently offered services in one embodiment. However, updating service capabilities currently requires routing adjacency to be dropped (e.g., lost) and also the established secure protocol channel (e.g., VPN 141, 142 and/or 143 of FIG. 1) be dropped (e.g., torn down) so that the new capabilities might be implemented on the hub and spokes. Such loss of connectivity (e.g., routing adjacency, tunnel) typically results in session interruption and loss of data traffic using the tunnel.

Figure 3A:
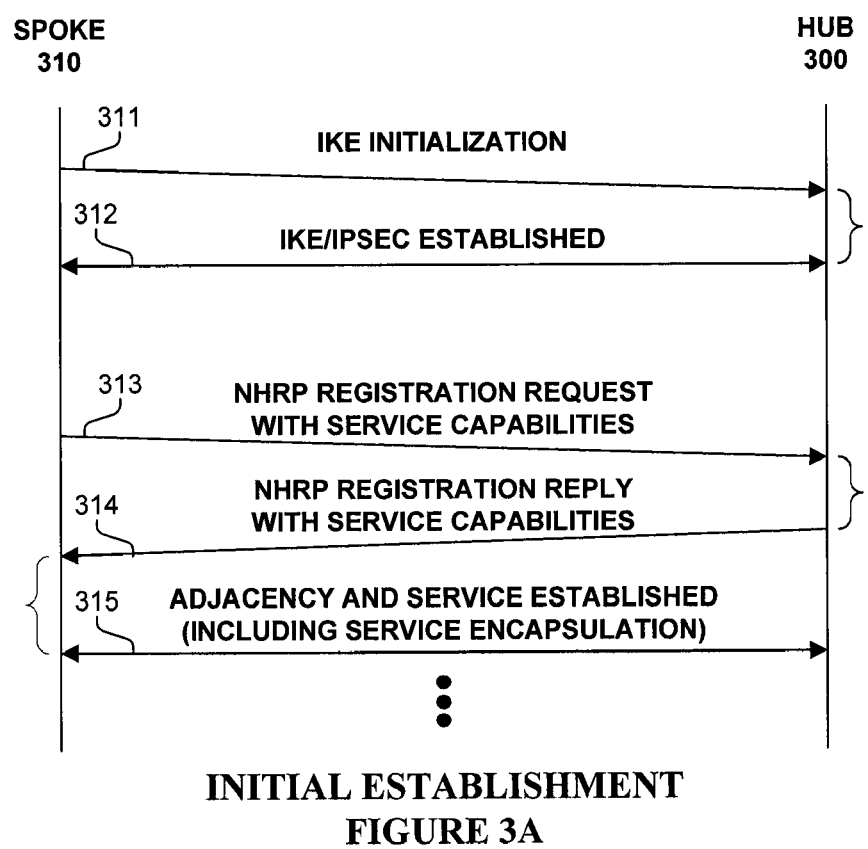
FIG. 3A illustrates a process according to one embodiment.

FIG. 3A illustrates the initial establishment of routing adjacency and service establishment (including service encapsulation) to be used in communicating between spoke 310 and hub 300 in a DMVPN network (e.g., such as, but not limited to DMVPN network 100 of FIG. 1).

In one embodiment, spoke 310 initiates (311) establishment of secure communications channel (e.g., IPSec VPN tunnel) between spoke 310 and hub 300, with this secure communications channel being established (312). Spoke 310 then initiates (313) establishment of routing adjacency and agreement of one or more negotiated service overlay capabilities including service encapsulation to use in communicating service overlay data packets between spoke 310 and the hub 300. In one embodiment, spoke 310 sends (313) a NHRP Registration Request with proposed initial service capabilities defined in a Vendor Private extension. In one embodiment, the NHRP Registration Request includes a flag (e.g., "C-bit") set to indicate negotiation of service capability included therein. In one embodiment, hub 300 responds (314) with a NHRP Registration Reply with its proposed initial service capabilities defined in a Vendor Private extension (and with the "C-bit" flag set in one embodiment). The corresponding routing adjacency and services are established (315) according to hub 300's proposed initial service capabilities (or additional negotiation may be performed in one embodiment). In one embodiment, the "C-bit" flag indicates a mandatory service capability, while in one embodiment it does not. After the routing adjacency and services capabilities have been established, packets are communicated between spoke 310 and hub 300 which includes data packets using the initially-negotiated service encapsulation of the agreed upon service capability.

Figure 3B:
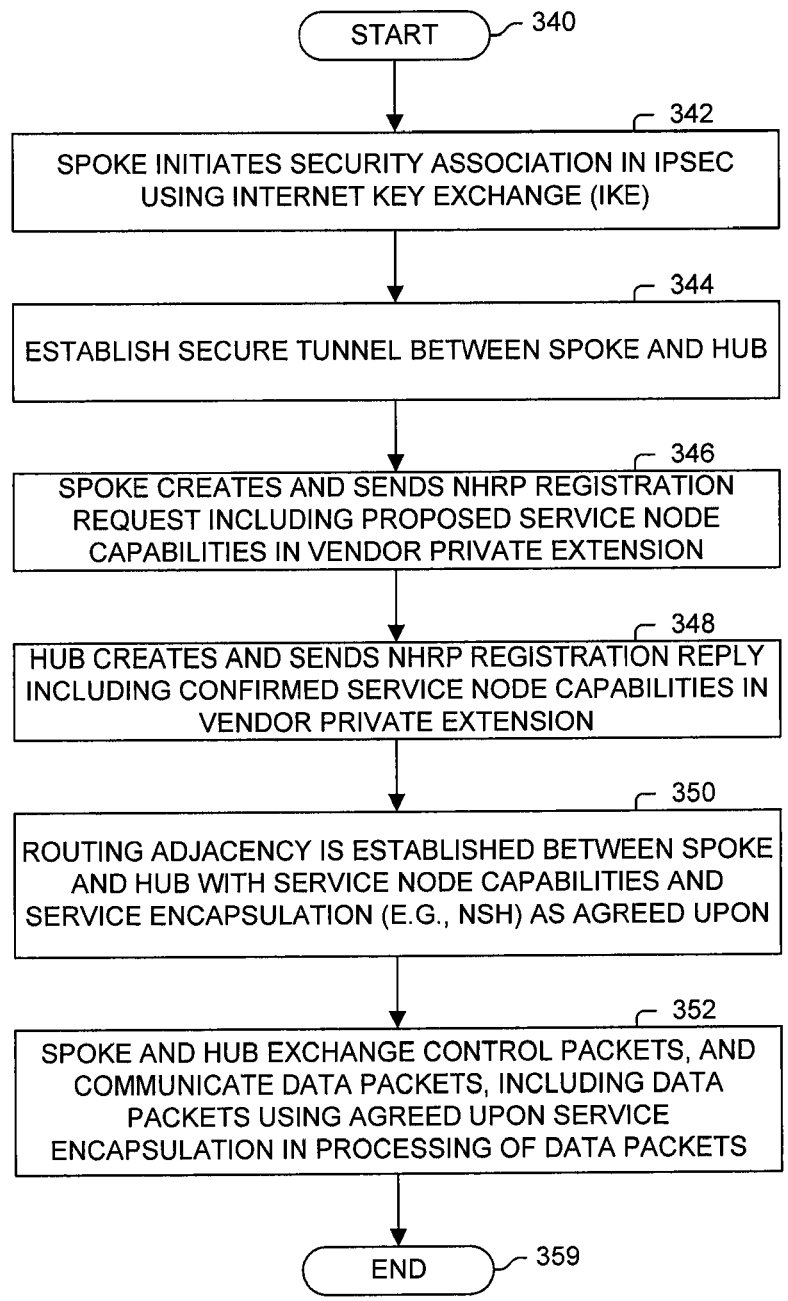
FIG. 3B illustrates a process according to one embodiment.

FIG. 3B illustrates a flow chart illustrating a process performed in initially establishing node adjacency and service capabilities (including service encapsulation) to be used in communicating between a spoke and hub in a DMVPN network in one embodiment. Processing begins with process block 340. In process block 342, the spoke initiates a security association in IPSec using Internet Key Exchange (IKE). In process block 344, the secure protocol channel is established between the spoke and hub. In process block 346, the spoke creates and sends a NHRP Registration Request including proposed service node capabilities in a Vendor Private Extension. In process block 348, the hub creates and sends a NHRP Registration Reply including agreed upon service node capabilities in a Vendor Private Extension. In process block 350, the routing adjacency is established between the spoke and the hub with the updated service node capabilities (including service encapsulation) as agreed upon. In process block 352, the spoke and the hub exchanges NHRP control packets and communicate data packets, including data packets using agreed upon service encapsulation. Processing of the flow diagram is complete as indicated by process block 359.

Figure 4A:
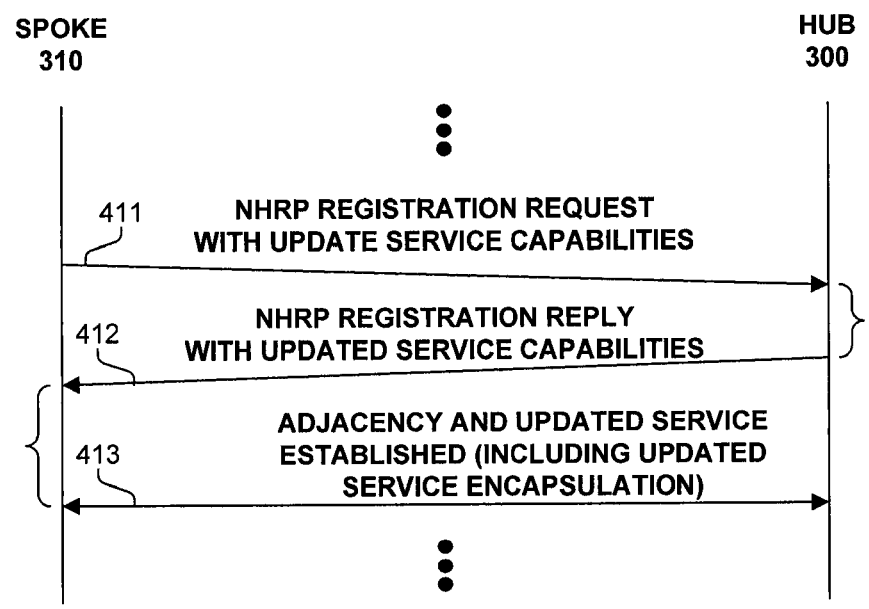
FIG. 4A illustrates a process according to one embodiment.

FIG. 4A illustrates a process performed in one embodiment in which spoke 310 initiates a change in service capabilities between spoke 310 and hub 300 with negotiating and establishing updated one or more service overlay capabilities being performed without dropping at least one of an established tunnel and established routing adjacency according to, but not limited to, a process described in relation to FIG. 3A and/or FIG. 3B.

In one embodiment in response to a detected change in service capability, spoke 310 then initiates (411) establishment of routing adjacency and agreement of one or more negotiated updated service overlay capabilities including service encapsulation to use in communicating service overlay data packets between spoke 310 and the hub 300. In one embodiment, spoke 310 sends (411) a NHRP Registration Request with proposed updated service capabilities defined in a Vendor Private extension. In one embodiment, the NHRP Registration Request includes a flag (e.g., "C-bit") set to indicate negotiation of service capability included therein. In one embodiment, hub 300 responds (412) with a NHRP Registration Reply with its proposed updated service capabilities defined in a Vendor Private extension (and with the "C-bit" flag set in one embodiment). The corresponding routing adjacency and services are established (413) according to hub 300's proposed updated service capabilities (or additional negotiation may be performed in one embodiment). In one embodiment, the "C-bit" flag indicates a mandatory service capability, while in one embodiment it does not. After the updated routing adjacency and updated service capabilities have been established, packets are communicated between spoke 310 and hub 300 which includes data packets using the negotiated updated service encapsulation of the agreed upon service capability.

Figure 4B:
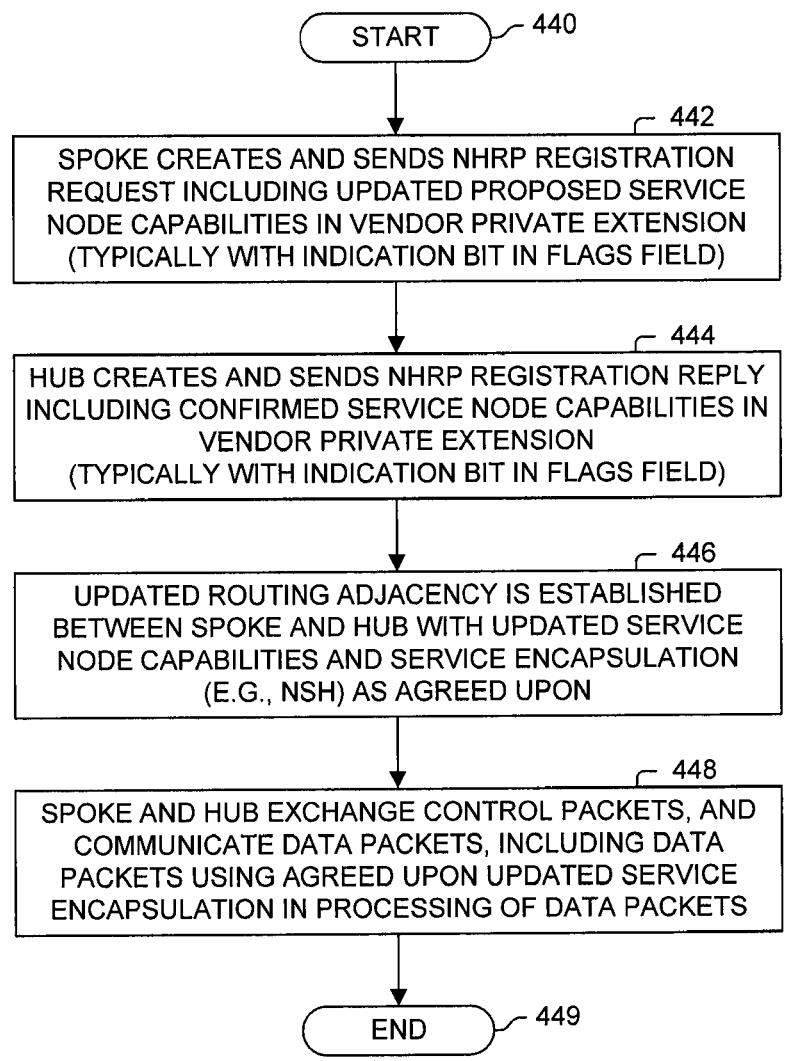
FIG. 4B illustrates a process according to one embodiment.

FIG. 4B illustrates a flow chart illustrating a process performed in one embodiment in which spoke 310 initiates a change in service capabilities between spoke 310 and hub 300 with negotiating and establishing updated one or more service overlay capabilities being performed without dropping at least one of an established tunnel and established routing adjacency according to, but not limited to, a process described in relation to FIG. 3A and/or FIG. 3B.

Processing of the flow diagram of FIG. 4B begins with process block 440. In process block 442, the spoke creates and sends a NHRP Registration Request including proposed updated service node capabilities in a Vendor Private Extension. In process block 444, the hub creates and sends a NHRP Registration Reply including agreed upon service node capabilities in a Vendor Private Extension. In process block 446, the routing adjacency is established between the spoke and the hub with the updated service node capabilities (including service encapsulation) as agreed upon. In process block 448, the spoke and the hub exchanges NHRP control packets and communicate data packets, including data packets using agreed upon updated service encapsulation. Processing of the flow diagram is complete as indicated by process block 449.

Figure 5A:
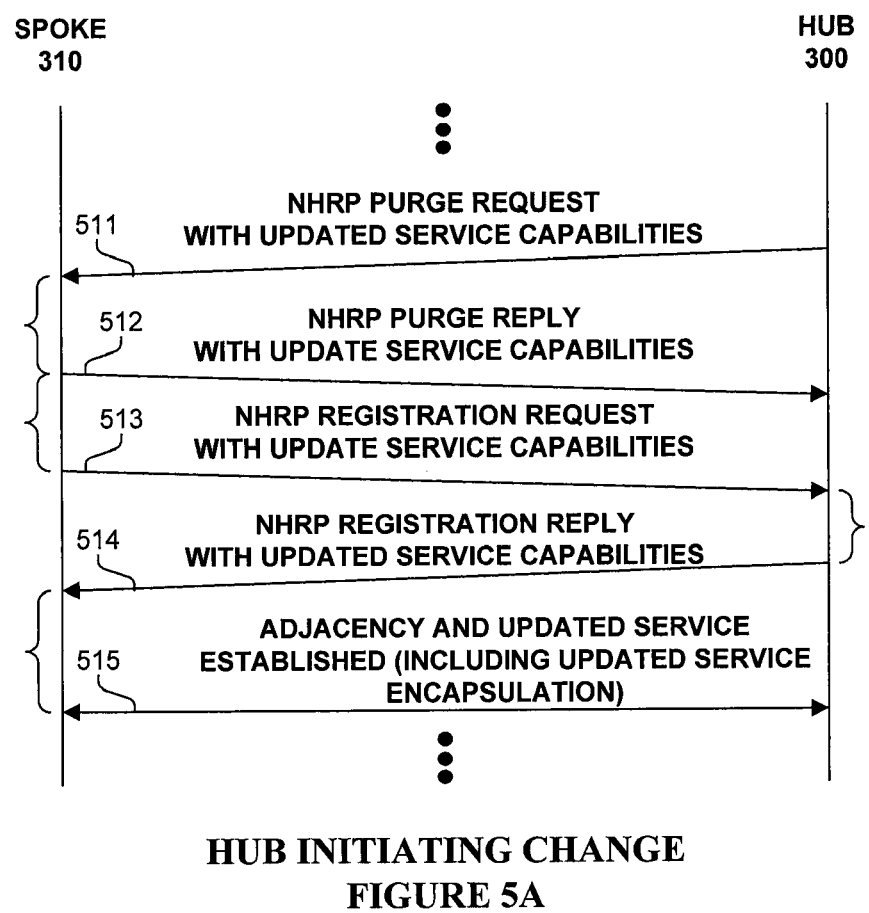
FIG. 5A illustrates a process according to one embodiment.

FIG. 5A illustrates a process performed in one embodiment in which hub 300 initiates a change in service capabilities between spoke 310 and hub 300 with negotiating and establishing updated one or more service overlay capabilities being performed without dropping at least one of an established tunnel and established routing adjacency according to, but not limited to, a process described in relation to FIG. 3A and/or FIG. 3B.

In one embodiment in response to a detected change in service capability, hub 300 then initiates (511) establishment of routing adjacency and agreement of one or more negotiated updated service overlay capabilities including service encapsulation to use in communicating service overlay data packets between spoke 310 and the hub 300. In one embodiment, hub 300 sends (511) a NHRP Purge Request with proposed updated service capabilities defined in a Vendor Private extension. In one embodiment, the NHRP Purge Request includes a flag (e.g., "C-bit") set to indicate negotiation of service capability included therein. In one embodiment, spoke 310 responds with a NHRP Purge Reply (512) and a NHRP Registration Request (513), each with its proposed updated service capabilities defined in a Vendor Private extension (and with the "C-bit" flag set in one embodiment) based on the updated capabilities requested by hub 300. In one embodiment, hub 300 responds (514) with a NHRP Registration Reply with its proposed updated service capabilities defined in a Vendor Private extension (and with the "C-bit" flag set in one embodiment). The corresponding routing adjacency and services are established (515) according to hub 300's proposed updated service capabilities (or additional negotiation may be performed in one embodiment). In one embodiment, the "C-bit" flag indicates a mandatory service capability, while in one embodiment it does not. After the updated Routing adjacency and updated service capabilities have been established, packets are communicated between spoke 310 and hub 300 which includes data packets using the negotiated updated service encapsulation of the agreed upon service capability.

Figure 5B:
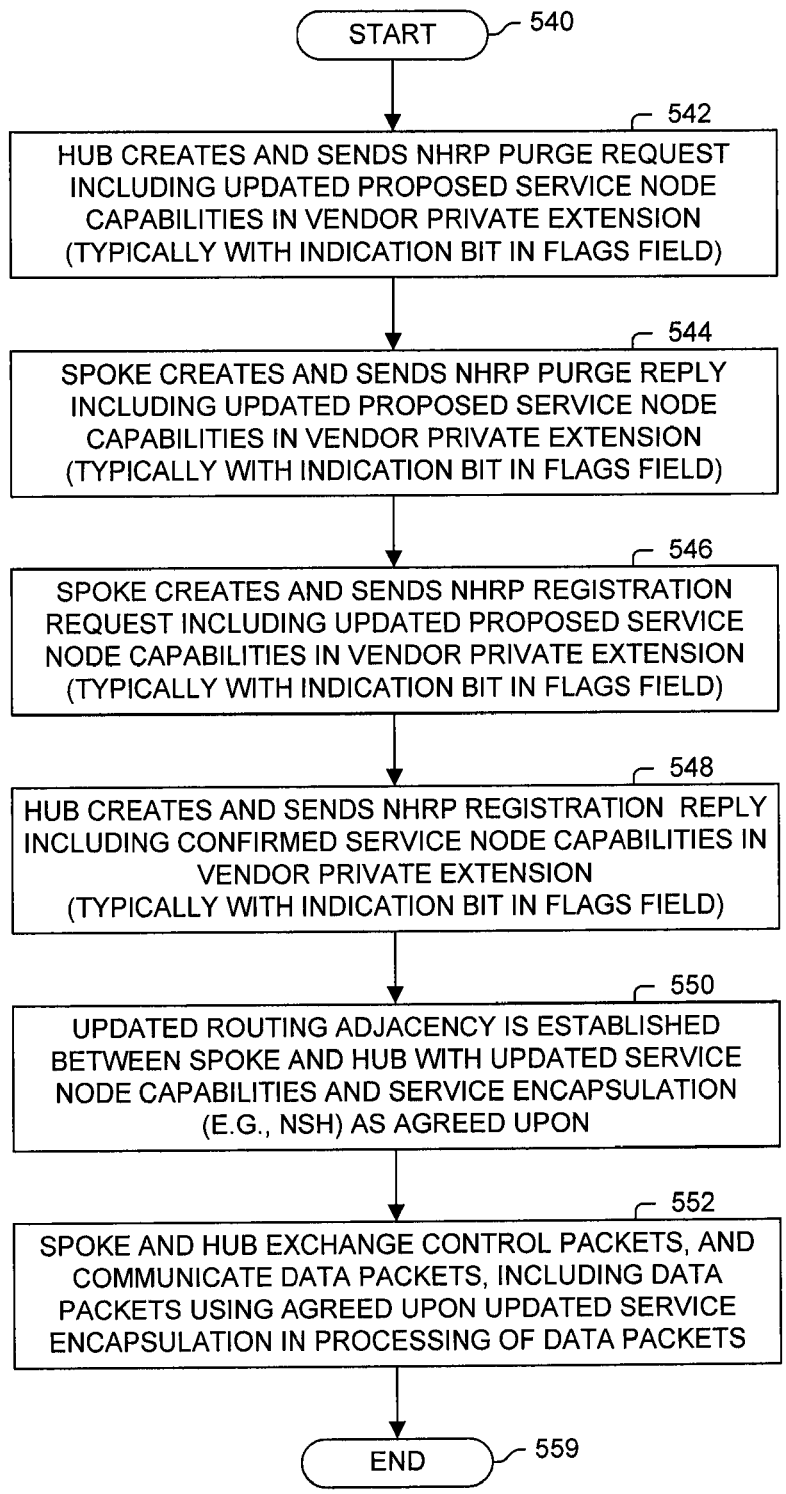
FIG. 5B illustrates a process according to one embodiment.

FIG. 5B illustrates a flow chart illustrating a process performed in one embodiment in which hub 300 initiates a change in service capabilities between spoke 310 and hub 300 with negotiating and establishing updated one or more service overlay capabilities being performed without dropping at least one of an established tunnel and established routing adjacency according to, but not limited to, a process described in relation to FIG. 3A and/or FIG. 3B.

Processing of the flow diagram of FIG. 5B begins with process block 540. In process block 542 and in response to a detected change in service capability, the hub creates and sends a NHRP Purge Request with proposed updated service capabilities defined in a Vendor Private extension. In process block 544, the spoke responds with a NHRP Purge Reply with its proposed updated service capabilities defined in a Vendor Private extension. In process block 546, the spoke creates and sends a NHRP Registration Request including proposed updated service node capabilities in a Vendor Private Extension. In process block 548, the hub creates and sends a NHRP Registration Reply including agreed upon service node capabilities in a Vendor Private Extension. In process block 550, the routing adjacency is established between the spoke and the hub with the updated service node capabilities (including service encapsulation) as agreed upon. In process block 552, the spoke and the hub exchanges NHRP control packets and communicate data packets, including data packets using agreed upon updated service encapsulation. Processing of the flow diagram is complete as indicated by process block 559.

Figure 6A:
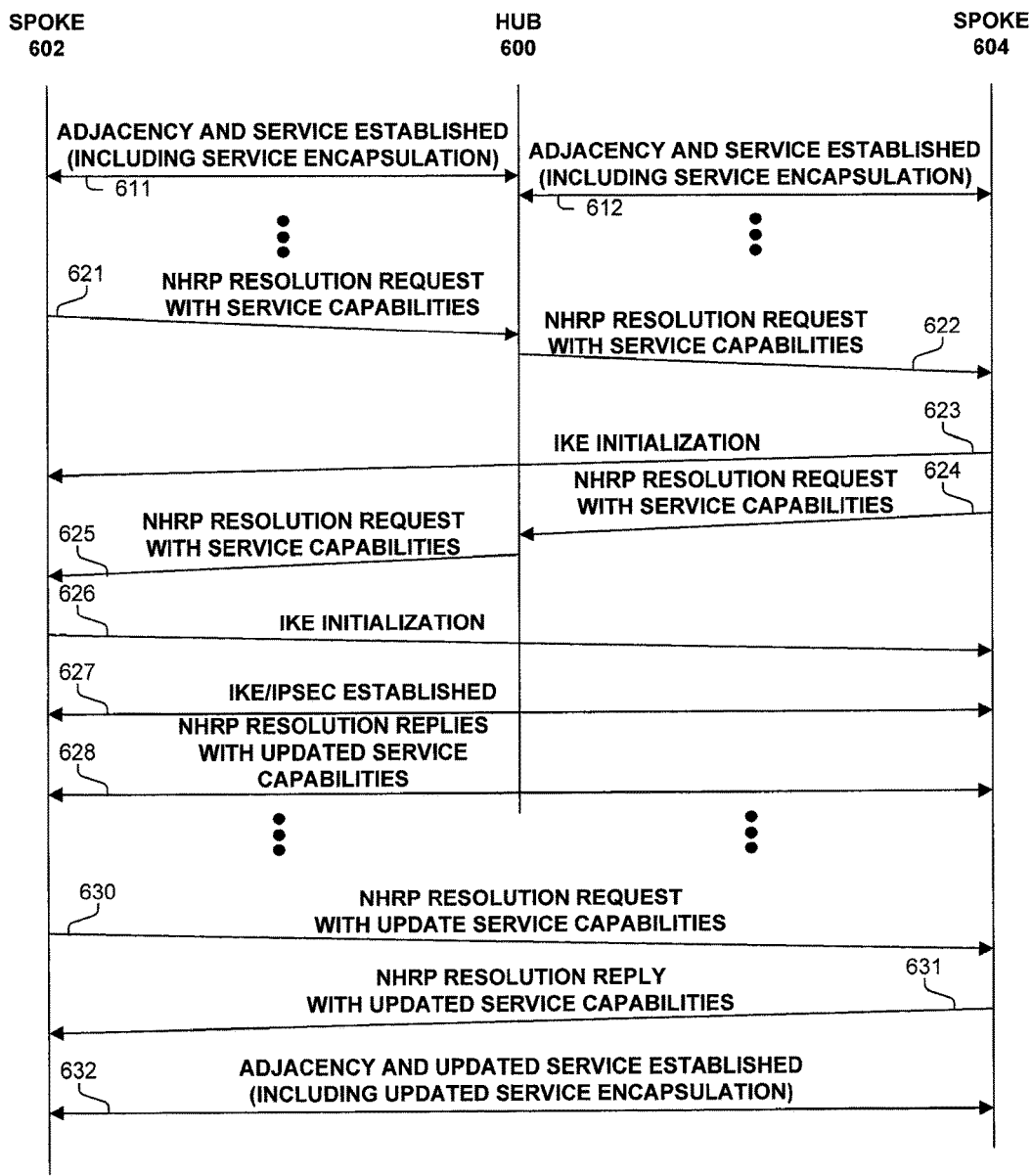
FIG. 6A illustrates a process according to one embodiment.

FIG. 6A illustrates the initial establishment of node adjacency and service capability establishment (including service encapsulation) to be used in communicating between first spoke 602 and second spoke 604 in a DMVPN network (e.g., such as, but not limited to DMVPN network 100 of FIG. 1), and subsequent updating of service capabilities.

First, each of spokes 602 and 604 establishes (611, 612) routing adjacency and service establishment (including service encapsulation) to be used in initially communicating between spoke 602 and hub 600 and between spoke 604 and hub 600 in a DMVPN network (e.g., such as, but not limited to DMVPN network 100 of FIG. 1) and such as, but not limited to, using a process described in relation to FIG. 3A and/or FIG. 3B.

Next, spoke 602 creates and sends (621) a NHRP Resolution Request with proposed initial service capabilities defined in a Vendor Private extension to hub 600, which forwards (622) to spoke 604. In response, spoke 604 initiates (623) establishment of secure communications channel (e.g., IPSec VPN tunnel) between spoke 604 and spoke 602. Spoke 602 creates and sends (624) a NHRP Resolution Request with proposed initial service capabilities defined in a Vendor Private extension to hub 600, which forwards (625) to spoke 604. In response, spoke 602 initiates (626) establishment of secure communications channel (e.g., IPSec VPN tunnel) between spoke 602 and spoke 604, with this secure communications channel being established (627). Each of spokes 602 and 604 creates and sends (628) over this established secure communications channel a NHRP Resolution Reply with agreed upon initial service capabilities defined in a Vendor Private extension.

In one embodiment subsequently and in response to a detected change in service capability, spoke 602 then initiates (630) establishment of routing adjacency and agreement of one or more negotiated updated service overlay capabilities including service encapsulation to use in communicating service overlay data packets between spoke 602 and the spoke 604. In one embodiment, spoke 602 sends (630) a NHRP Resolution Request with proposed updated service capabilities defined in a Vendor Private extension. In one embodiment, spoke 604 responds (631) with a NHRP Resolution Reply with its proposed updated service capabilities defined in a Vendor Private extension. The corresponding routing adjacency and services are established (632) according to the negotiated updated service capabilities (or additional negotiation may be performed in one embodiment). In one embodiment, one or more of the NHRP Resolution Requests and/or Replies includes a flag (e.g., "C-bit") set to indicate negotiation of service capability included therein. In one embodiment, the "C-bit" flag indicates a mandatory service capability, while in one embodiment it does not. After the updated routing adjacency and updated service capabilities have been established, packets are communicated between spoke 602 and spoke 604 which includes data packets using the negotiated updated service encapsulation of the agreed upon service capability.

Figure 6B:
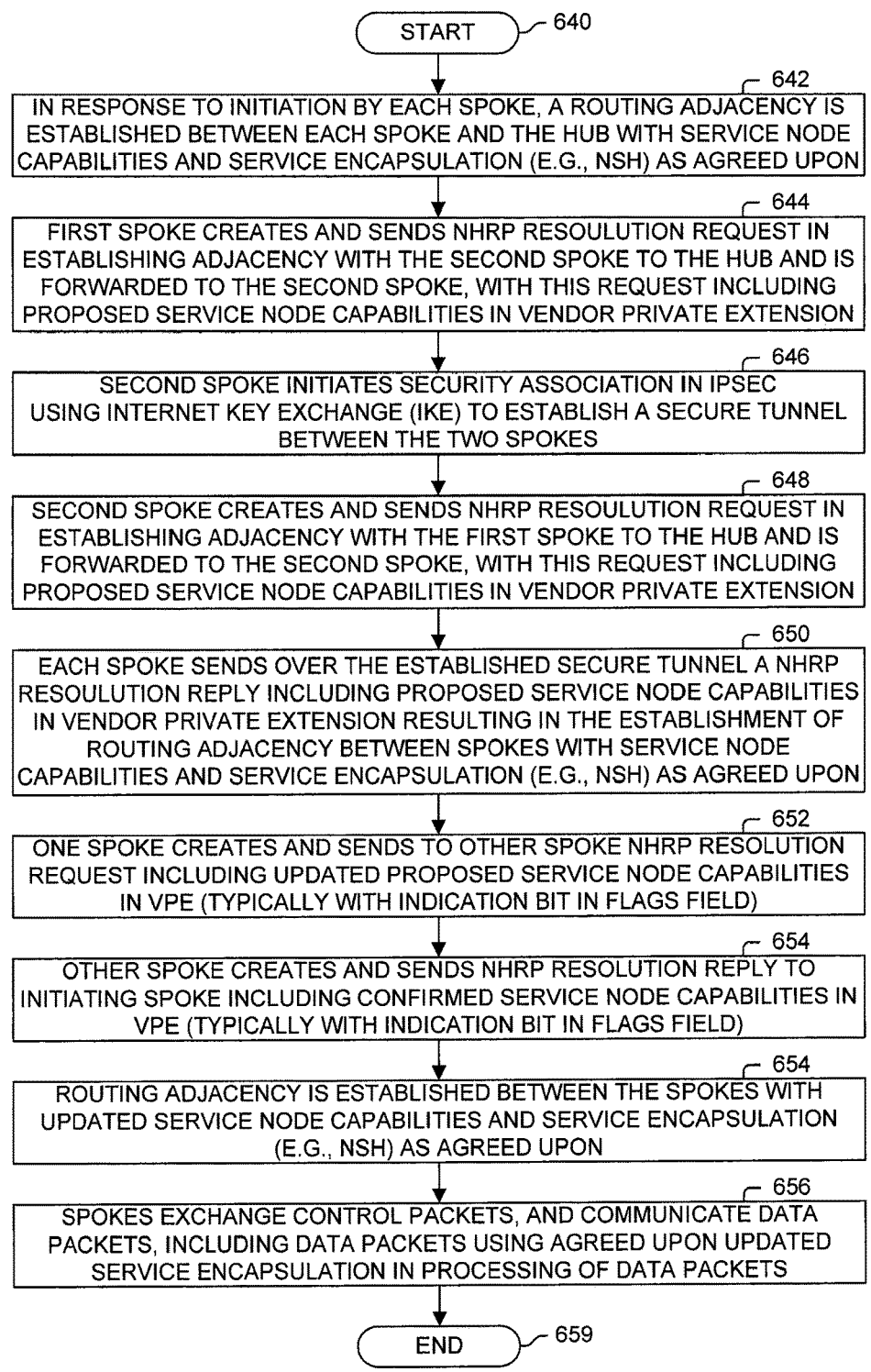
FIG. 6B illustrates a process according to one embodiment.

FIG. 6B illustrates a flow chart illustrating a process performed in one embodiment in which spoke 602 initiates a change in service capabilities between spoke 602 and spoke 604 (e.g., of FIG. 6A) with negotiating and establishing updated one or more service overlay capabilities being performed without dropping at least one of an established tunnel and established routing adjacency previously established.

Processing of the flow diagram of FIG. 6B begins with process block 640. In process block 642 and in response to initiation by each spoke, a routing adjacency is established between each spoke and the hub with service node capabilities and service encapsulation (e.g., NSH) as agreed upon. In process block 644, the first spoke creates and sends a NHRP Resolution Request in establishing adjacency with the second spoke to the hub, which forwards the NHRP Resolution Request to the second spoke, with the NHRP Resolution Request including proposed service node capabilities in vendor private extension. In process block 646, the second spoke initiates security association in IPSec using Internet Key Exchange (IKE) to establish a secure tunnel between the two spokes. In process block 648, the second spoke creates and sends NHRP Resolution Request in establishing adjacency with the first spoke to the hub and is forwarded to the second spoke, with this request including proposed service node capabilities in vendor private extension. In process block 650, each spoke sends over the established secure tunnel a NHRP Resolution Reply including proposed service node capabilities in vendor private extension resulting in the establishment of routing adjacency between spokes with service node capabilities and service encapsulation (e.g., NSH) as agreed upon.

In process block 652 and in response to identifying new service capabilities, one spoke creates and sends to other spoke a NHRP Resolution Request including updated proposed service node capabilities in a Vendor Private extension (typically with indication bit in flags field). In process block 654, the other spoke creates and sends a NHRP Resolution Reply to initiating spoke including confirmed service node capabilities in Vendor Private extension (typically with indication bit in flags field). In process block 654, routing adjacency is established between the spokes with updated service node capabilities and service encapsulation (e.g., NSH) as agreed upon In process block 656, spokes exchange control packets, and communicate data packets, including data packets using agreed upon updated service encapsulation in processing of data packets. Processing of the flow diagram is complete as indicated by process block 659.

As described herein, duplicate service capability information might be communicated, inter alia, in a reply message to a request message. In one embodiment if there is no change in service capability information or the information is not duplicative or communicative, a message will not include such service capability information.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method comprising:
   establishing a particular tunnel between a spoke and a hub of a Dynamic Multipoint Virtual Private Network (DMVPN), wherein said established particular tunnel is a secure protocol channel;
   communicating, between the spoke and the hub over said established particular tunnel, Next Hop Resolution Protocol (NHRP) messages resulting in an identification of one or more negotiated service overlay capabilities including service encapsulation to use in communicating service overlay data packets between the spoke and the hub over said established particular tunnel;

communicating a plurality of packets including data packets between the spoke and the hub over said established particular tunnel using said negotiated service overlay capabilities;

subsequent to said communicating the plurality of packets including data packets, communicating, between the spoke and the hub over said established particular tunnel, additional Next Hop Resolution Protocol (NHRP) messages resulting in an identification of one or more updated negotiated service overlay capabilities including updated service encapsulation to subsequently use in communicating service overlay data packets between the spoke and the hub; and subsequent to said communicating additional Next Hop Resolution Protocol (NHRP) messages, communicating a plurality of additional packets including data packets between the spoke and the hub over said established tunnel using said updated negotiated service overlay capabilities;

wherein said established particular tunnel is not dropped between said operations of establishing the particular tunnel and said communicating the plurality of additional packets using said updated negotiated service overlay capabilities.

2. The method of claim 1, wherein said communicating additional Next Hop Resolution Protocol (NHRP) messages resulting in an identification of one or more updated negotiated service overlay capabilities is initiated by the spoke.

3. The method of claim 2, wherein said communicating additional Next Hop Resolution Protocol (NHRP) messages includes the spoke sending a Next Hop Resolution Protocol (NHRP) Registration Request including an indication of proposed updated service overlay capabilities to the hub; and in response, the hub sending a NHRP Registration Reply including an indication of said one or more updated negotiated service overlay capabilities.

4. The method of claim 3, wherein said service encapsulation includes a Network Service Header (NSH).

5. The method of claim 2, wherein said communicating additional Next Hop Resolution Protocol (NHRP) messages includes the hub initially sending a Next Hop Resolution Protocol (NHRP) Purge Request to the spoke.

6. The method of claim 5, wherein the NHRP Purge Request includes an indication of said one or more updated negotiated service overlay capabilities.

7. The method of claim 6, wherein said service encapsulation includes a Network Service Header (NSH).

8. The method of claim 2, wherein said communicating additional Next Hop Resolution Protocol (NHRP) messages includes: the hub sending a Next Hop Resolution Protocol (NHRP) Purge Request including an indication of proposed updated service overlay capabilities to the spoke; the spoke sending a Next Hop Resolution Protocol (NHRP) Registration Request including an indication of proposed updated service overlay capabilities to the hub; and in response, the hub sending a NHRP Registration Reply including an indication of said one or more updated negotiated service overlay capabilities.

9. The method of claim 8, wherein said communicating additional Next Hop Resolution Protocol (NHRP) messages includes the spoke sending to the hub a NHRP Purge Reply including an indication of proposed updated service overlay capabilities.

10. The method of claim 9, wherein said service encapsulation includes a Network Service Header (NSH).

11. The method of claim 9, wherein said communicating additional Next Hop Resolution Protocol (NHRP) messages includes the spoke sending a Next Hop Resolution Protocol (NHRP) Registration Request including an indication of proposed updated service overlay capabilities to the hub; and in response, the hub sending a NHRP Registration Reply including an indication of said one or more updated negotiated service overlay capabilities.

12. The method of claim 1, wherein said service encapsulation includes a Network Service Header (NSH).

13. A packet switching device, comprising:
one or more processing elements;
memory;
a plurality of interfaces that send and receive packets; and
one or more packet switching mechanisms that packet switch packets among said interfaces;
wherein the packet switching device operates as a spoke of a Dynamic Multipoint Virtual Private Network (DMVPN) over an established tunnel and established routing adjacency using one or more initially negotiated service overlay capabilities including service encapsulation used in communicating a plurality of service overlay data packets between the packet switching device and a hub of the DMVPN over said established tunnel;
wherein subsequent to said communicating the plurality of service overlay data packets, the packet switching device performs operations including communicating with the hub over said established tunnel additional Next Hop Resolution Protocol (NHRP) messages resulting in an identification of one or more updated negotiated service overlay capabilities including updated service encapsulation to subsequently use in communicating service overlay data packets between the packet switching device and the hub; and subsequently, communicating a plurality of additional packets including data packets between the packet switching device and the hub over said established tunnel using said updated negotiated service overlay capabilities;
wherein said established tunnel is a secure protocol channel; and
wherein said established tunnel is not dropped between said operations of communicating the plurality of service overlay data packets and communicating the plurality of additional packets.

14. The packet switching device of claim 13, wherein said communicating additional Next Hop Resolution Protocol (NHRP) messages is initiated by the packet switching device.

15. The packet switching device of claim 14, wherein said communicating additional Next Hop Resolution Protocol (NHRP) messages includes the packet switching device sending a Next Hop Resolution Protocol (NHRP) Registration Request including an indication of proposed updated service overlay capabilities to the hub; and in response, the hub sending a NHRP Registration Reply including an indication of said one or more updated negotiated service overlay capabilities.

16. The packet switching device of claim 14, wherein said communicating additional Next Hop Resolution Protocol (NHRP) messages includes the hub initially sending a Next Hop Resolution Protocol (NHRP) Purge Request to the packet switching device; and wherein the NHRP Purge Request includes an indication of said one or more updated negotiated service overlay capabilities.

17. The packet switching device of claim 14, wherein said communicating additional Next Hop Resolution Protocol (NHRP) messages includes the hub sending a Next Hop Resolution Protocol (NHRP) Purge Request including an indication of proposed updated service overlay capabilities to the packet switching device; the packet switching device sending a Next Hop Resolution Protocol (NHRP) Registration Request including an indication of proposed updated service overlay capabilities to the hub; and in response, the hub sending a NHRP Registration Reply including an indication of said one or more updated negotiated service overlay capabilities.

18. The packet switching device of claim 17, wherein said communicating additional Next Hop Resolution Protocol (NHRP) messages includes the packet switching device sending to the hub a NHRP Purge Reply including an indication of proposed updated service overlay capabilities; and wherein said service encapsulation includes a Network Service Header (NSH).

19. The packet switching device of claim 18, wherein said communicating additional Next Hop Resolution Protocol (NHRP) messages includes the packet switching device sending a Next Hop Resolution Protocol (NHRP) Registration Request including an indication of proposed updated service overlay capabilities to the hub; and in response, the hub sending a NHRP Registration Reply including an indication of said one or more updated negotiated service overlay capabilities.

* * * * *